(12) United States Patent
Lin et al.

(10) Patent No.: US 8,781,190 B2
(45) Date of Patent: Jul. 15, 2014

(54) IMAGE-RECOGNITION METHOD FOR ASSISTING OPHTHALMIC EXAMINATION INSTRUMENT

(75) Inventors: Chun Nan Lin, Taoyuan County (TW); Chung Ping Chuang, Taoyuan County (TW); Che Liang Tsai, Taichung (TW)

(73) Assignee: Crystalvue Medical Corporation, Taoyuan County (TW)

( * ) Notice: Subject to any disclaimer, the term of this patent is extended or adjusted under 35 U.S.C. 154(b) by 100 days.

(21) Appl. No.: 13/584,262

(22) Filed: Aug. 13, 2012

(65) Prior Publication Data
US 2014/0044326 A1 Feb. 13, 2014

(51) Int. Cl.
*G06K 9/00* (2006.01)
(52) U.S. Cl.
USPC ......................................................... 382/128
(58) Field of Classification Search
None
See application file for complete search history.

(56) References Cited

U.S. PATENT DOCUMENTS

| 6,769,769 | B2* | 8/2004 | Podoleanu et al. | 351/221 |
| 8,593,514 | B2* | 11/2013 | Satake | 348/78 |
| 2007/0091434 | A1* | 4/2007 | Garner et al. | 359/459 |
| 2009/0180123 | A1* | 7/2009 | Knighton et al. | 356/479 |
| 2010/0026731 | A1* | 2/2010 | Konuma | 345/690 |
| 2010/0110172 | A1* | 5/2010 | Satake | 348/78 |
| 2010/0123872 | A1* | 5/2010 | Aikawa et al. | 351/208 |
| 2010/0165291 | A1* | 7/2010 | Sugita et al. | 351/206 |
| 2011/0007321 | A1* | 1/2011 | Everett et al. | 356/479 |
| 2011/0007957 | A1* | 1/2011 | Sakagawa | 382/131 |
| 2011/0096333 | A1* | 4/2011 | Suehira et al. | 356/479 |

* cited by examiner

*Primary Examiner* — Tahmina Ansari
(74) *Attorney, Agent, or Firm* — Rabin & Berdo, P.C.

(57) ABSTRACT

An image-recognition assisting method includes the steps of using an examination instrument to generate an image having a split-image area formed thereon; setting a region-of-interest (ROI) around the split-image area of the generated image; performing a pixel luminance addition processing on the ROI, so that all pixels in the ROI have increased luminance contrast; and performing a contrast correction on the ROI having increased luminance contrast, so that the luminance contrast between the split-image area and the area surrounding the split-image area in the ROI is further increased. The image-recognition assisting method optimizes the image generated by the conventional ophthalmic examination instrument, such as a fundus camera, to increase the sharpness and the luminance contrast of the image output by the fundus camera, so that an examiner can easily recognize two offset rectangular image parts in the split-image area and align them with each other to focus the examination instrument.

6 Claims, 4 Drawing Sheets

IMAGE-RECOGNITION METHOD FOR ASSISTING OPHTHALMIC EXAMINATION INSTRUMENT

FIELD OF THE INVENTION

The present invention relates to an image recognition method applied to optical focusing of examination instruments, and more particularly to an image-recognition assisting method for optimizing the sharpness and luminance contrast of a split image formed by a split-image focusing screen on, for example, a fundus image captured by an ophthalmic examination instrument, so that an examiner can easily recognize the optimized split image to focus the fundus image for outputting.

BACKGROUND OF THE INVENTION

Most of the conventional eye-fundus cameras use a split-image focusing screen to assist in focusing thereof. Please refer to FIG. 1. The split-image focusing screen utilizes two prisms and a slit to form a split image having an upper and a lower rectangular image part on an image sensor, such as a charge coupled device (CCD) sensor. When an eye-fundus camera is not focused, the two rectangular image parts are vertically offset from each other, i.e. they are not vertically aligned with each other. On the other hand, when the eye-fundus camera is focused, the upper and the lower rectangular image part of the split image are aligned with each other to form a complete image.

Since the light intensity acceptable by human eyes is not high, the light source projected onto an examinee's eye via an ophthalmic examination instrument, such as the eye-fundus camera, can have only limited light intensity. Further, as being affected by the physical characteristics of optical elements in the conventional ophthalmic examination instrument, the split image formed on the fundus image captured by the examination instrument is not so clear, as shown in FIG. 2. An examiner can only roughly find two extremely vague rectangular image parts located at a central area of the very dark split image. It is very difficult for the examiner to clearly recognize the positions of the two rectangular image parts and accurately align them with each other to achieve the purpose of focusing the examination instrument.

In view of the inconveniences and drawbacks in focusing the existing ophthalmic examination instrument with the help of a split-image focusing screen, it is desirable to develop an improved image-recognition assisting method to help the examiner quickly and clearly recognize the split image to complete correct focusing of the examination instrument.

SUMMARY OF THE INVENTION

A primary object of the present invention is to provide an image-recognition assisting method for optimizing a split image formed by a split-image focusing screen on, for example, a fundus image captured by a conventional ophthalmic examination instrument, so that the split image has increased sharpness and luminance contrast for an examiner to easily recognize two vertically offset rectangular image parts of the split image and focus the fundus image by aligning the two offset rectangular image parts with each other.

To achieve the above and other objects, the image-recognition assisting method according to the present invention includes the steps of using an examination instrument to generate an image having a split-image area formed thereon; setting a region-of-interest (ROI) around the split-image area of the generated image; performing a pixel luminance addition processing on the ROI, so that all pixels in the ROI have increased luminance contrast; and performing a contrast correction on the ROI having increased luminance contrast, so that the luminance contrast between the split-image area and the area surrounding the split-image area in the ROI is further increased.

In the method of the present invention, the examination instrument is an ophthalmic examination instrument for examining an examinee's retina; the ROI can be defined by a value manually set by an examiner for forming a required size of the ROI or by one of preset values in the examination instrument; and the pixel luminance addition processing increases the luminance contrast of all pixels in the ROI by adding luminance values of pixels surrounding each pixel to a luminance value of the surround pixel.

In a preferred embodiment of the present invention, the contrast correction is implemented by Gamma correction. The Gamma correction further increases the luminance of pixels having a relatively higher luminance value and further reduces the luminance of pixels having a relatively lower luminance value, so that an increased and clearly recognizable luminance contrast is created between the split-image area and the surrounding area in the ROI for the examiner to easily and correctly align the two offset image parts in the split-image area with each other to achieve the purpose of focusing the examination instrument.

Therefore, the method of the present invention is characterized in defining an ROI around a vague and dark split-image area on an image generated by an ophthalmic examination instrument, performing the pixel luminance addition processing on adjoining pixels in the ROI, and performing Gamma correction to largely sharpen the offset rectangular image parts in the split-image area and the area surrounding the split-image area to create a strong contrast between them. Therefore, the examiner can easily recognize the two offset rectangular image parts of the split image and make necessary adjustment to align them with each other to achieve optimized focusing of the examination instrument. And, the problem of a vague split image formed by the conventional split-image focusing screen can be overcome.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings.

Figure 3:
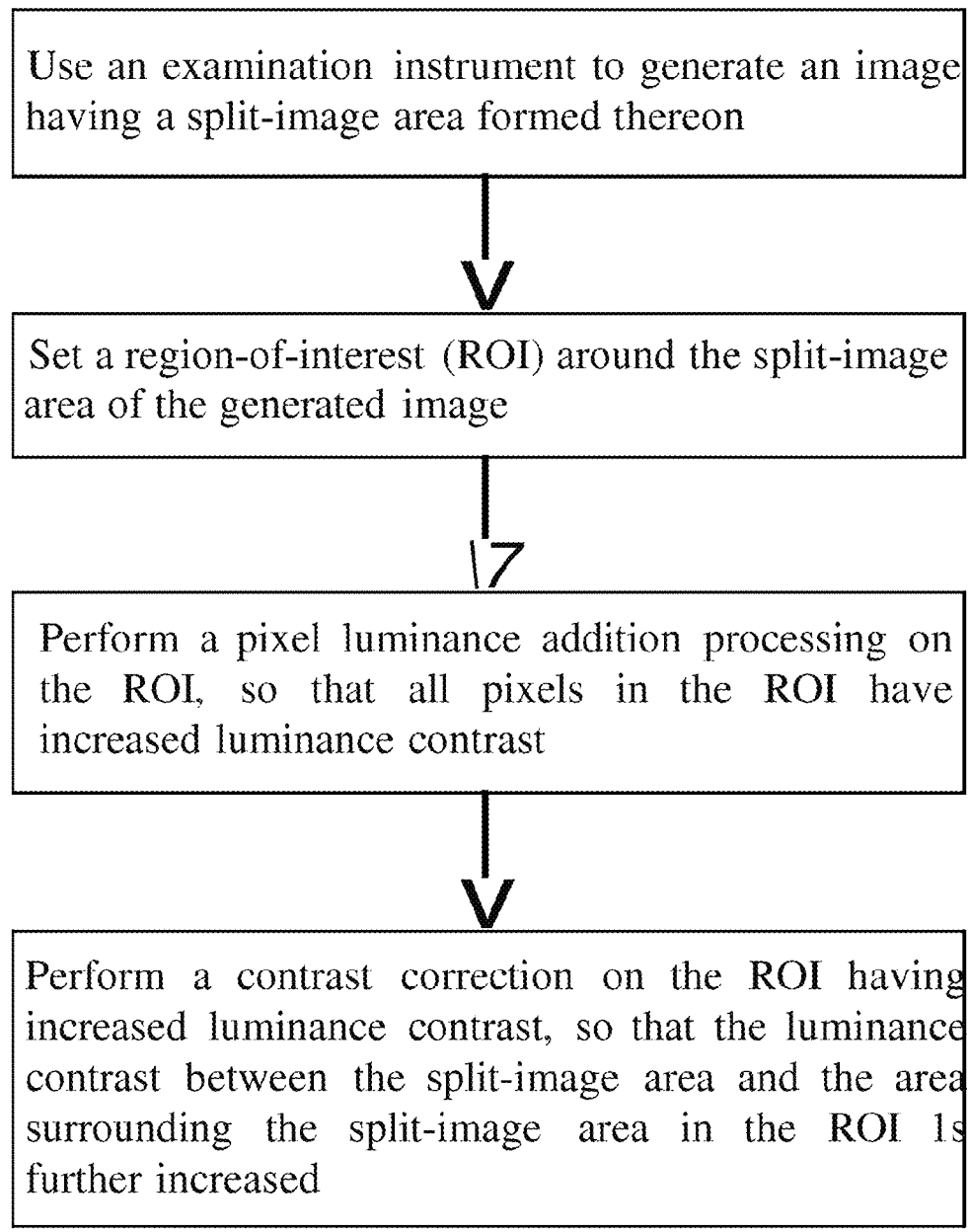
FIG. 3 is a flowchart showing the steps included in an image-recognition assisting method according to the present invention for an ophthalmic examination instrument.

Please refer to FIG. 3, which is a flowchart of an image-recognition assisting method according to a preferred embodiment of the present invention. As shown, the image-recognition assisting method of present invention includes the following steps:

(a) Using an examination instrument to generate an image having a split-image area formed thereon;
(b) Setting a region-of-interest (ROI) around the split-image area of the generated image;
(c) Performing a pixel luminance addition processing on the ROI, so that all pixels in the ROI have increased luminance contrast; and
(d) Performing a contrast correction on the ROI having increased luminance contrast, so that the luminance contrast between the split-image area and the area surrounding the split-image area in the ROI is further increased.

Figure 1:
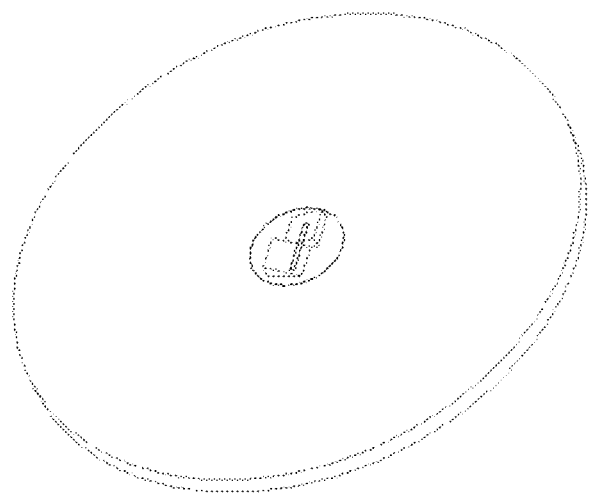
FIG. 1 is a schematic view showing the structure of a conventional split-image focusing screen for an examination instrument.
Figure 2:
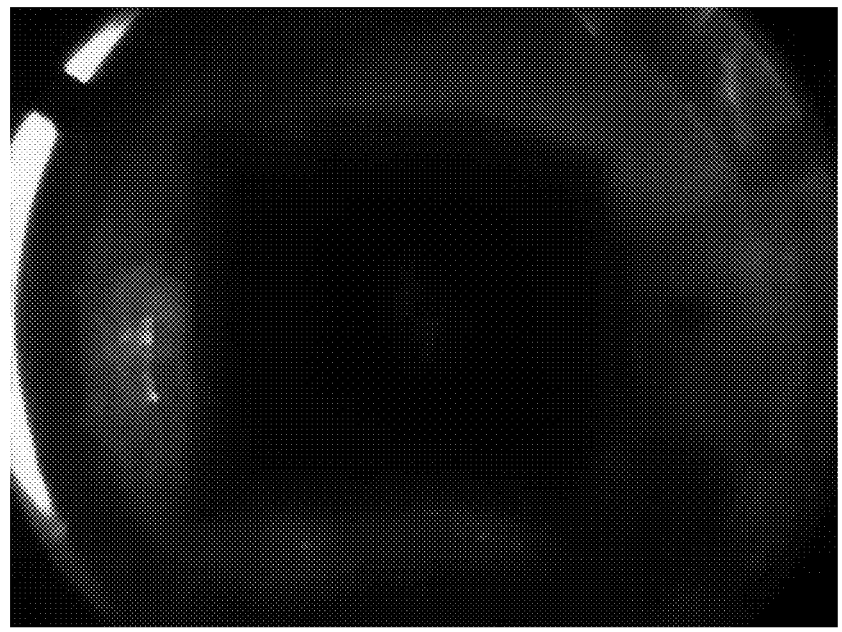
FIG. 2 shows an image having a split image formed thereon by the conventional split-image focusing screen of FIG. 1.

Please refer to FIG. 2. The examination instrument used in the above step (a) is an ophthalmic examination instrument for examining an examinee's retina. With the retina examination instrument, a light beam emitted from a light source is split by a beam splitter into an upper and a lower light beam, which are focused on the examinee's fundus and then reflected from the fundus to form two images on an image sensor, so that an examiner observes in the retina examination instrument an upper and a lower substantially rectangular image part that are vertically offset each other. The image sensor can be a charge coupled device (CCD) sensor.

Figure 4:
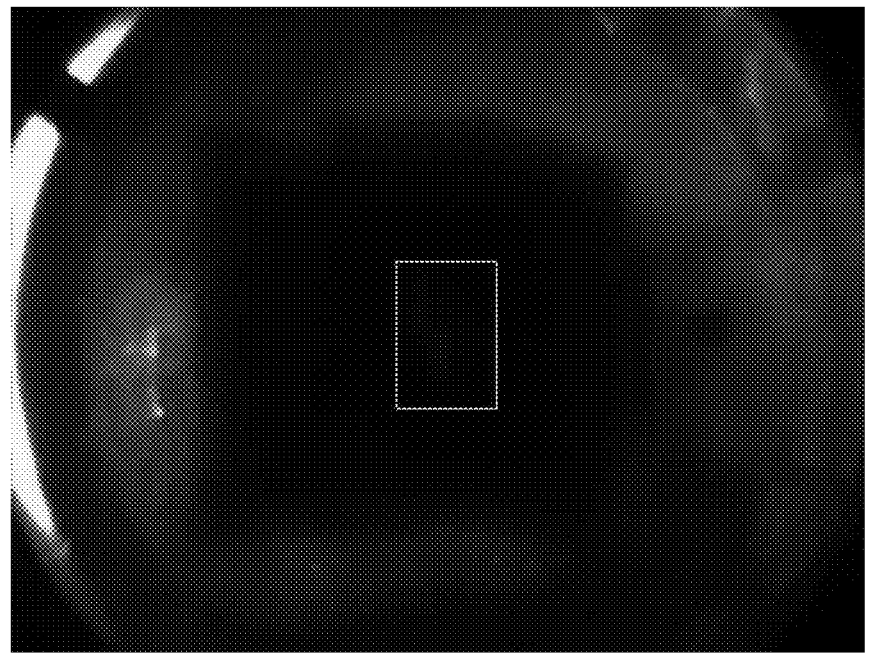
FIG. 4 shows a region-of-interest (ROI) is set around a split-image area formed by the conventional split-image focusing screen on an image captured by the examination instrument.

Please refer to FIG. 4. In the step (b) of the method according to the present invention, an image processing system is employed for retrieval of an ROI from the image generated by the examination instrument. The ROI must include the split-image area that has two offset image parts formed therein. As can be seen in FIG. 4, according to the present invention, a rectangular frame is defined on the image generated by the examination instrument. The rectangular frame can be defined using one of many preset values in the image processing system to enclose an area surrounding the relatively vague split-image area obtained in the step (a). In the event the image processing system does not include any preset value suitable for defining the ROI with a required size, the examiner may also manually set a value for defining the required ROI.

Figure 5:
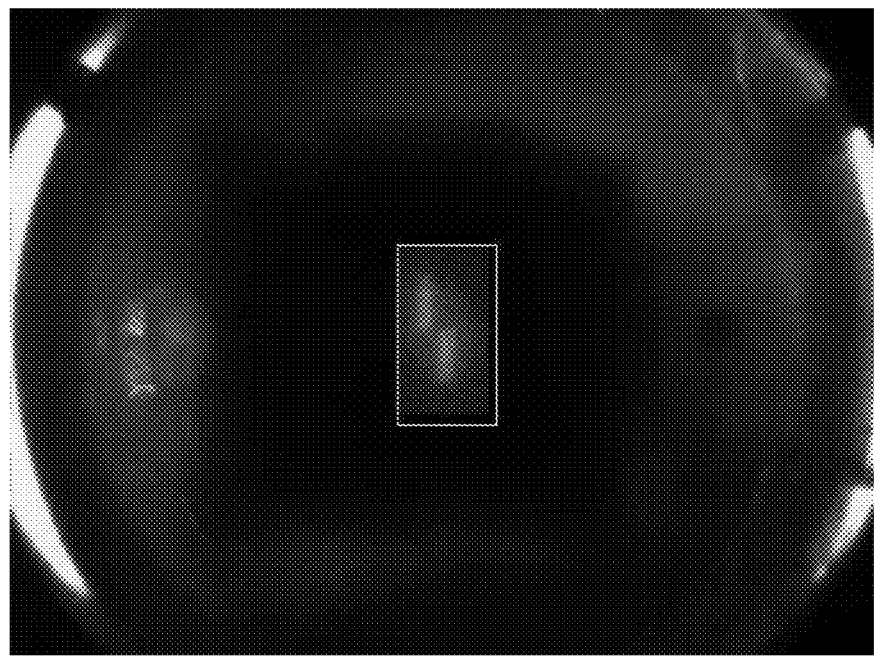
FIG. 5 shows the ROI around the split-image area after a pixel luminance addition processing.

As can be seen in FIG. 5, in the step (c) of the present invention, the image processing system is further used to perform a pixel luminance addition processing on the ROI, so that all the pixels in the ROI have an increased luminance contrast by adding the luminance values of pixels surrounding each pixel to the luminance value of the surrounded pixel.

For example, suppose the split-image area has an original luminance value of 10, and area surrounding the split-image area has a lower luminance value of 5. Therefore, the luminance difference between the split-image area and the darker surrounding area before the image processing is 5. However, after the pixel luminance addition processing, i.e. after the luminance values of four surrounding pixels (upper, lower, left and right pixels) are added to the luminance value of each of the surrounded pixels, the whole split-image area will have an increased luminance value of 50 while the surrounding area will have an increased luminance value of 25. That is, the image luminance for the image-processed split-image area is 10 (the surrounded pixel)+10 (the upper pixel)+10 (the lower pixel)+10 (the left pixel)+10 (the right pixel)=50; and the image luminance for the image-processed surrounding area is 5 (the surrounded pixel)+5 (the upper pixel)+5 (the lower pixel)+5 (the left pixel)+5 (the right pixel)=25. At this stage, the luminance difference between the split-image area and the surrounding area is increased to be 25, as shown in FIG. 5. From a comparison between FIG. 4 and FIG. 5, it can be easily found the split-image area after the pixel luminance addition processing as shown in FIG. 5 is now clearly visible in the image generated by the examination instrument, and an examiner can recognize the relative position between the two offset rectangular image parts of the split image.

In the step (d), the image processing system is again used to perform a contrast correction. In the preferred embodiment of the present invention, the contrast correction is implemented by Gamma correction, also referred to as Gamma nonlinearity or Gamma encoding, which is a nonlinear operation or inverse operation used to code and decode luminance or tristimulus values in an image system.

In the present invention, the Gamma correction is used to further increase the pixel luminance of the pixels that have relatively higher luminance in the image and further decrease the pixel luminance of the pixels that have relatively lower luminance in the image, so that the luminance contrast between the split-image area and the surrounding area in the ROI is further increased to create a clearly recognizable luminance difference between them, allowing the examiner to easily determine the positions of the two offset image parts of the split image in the ROI.

Figure 6:
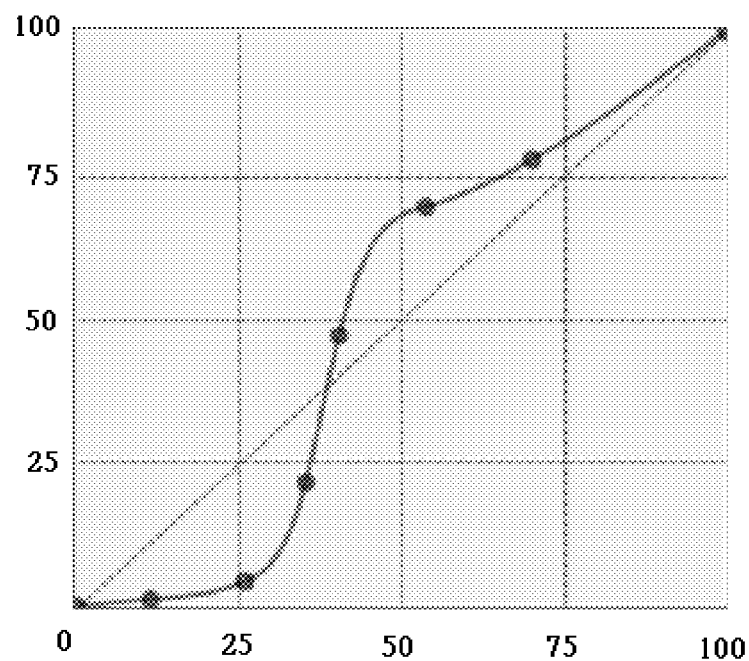
FIG. 6 is a data graph of the ROI corrected by Gamma correction.
Figure 7:
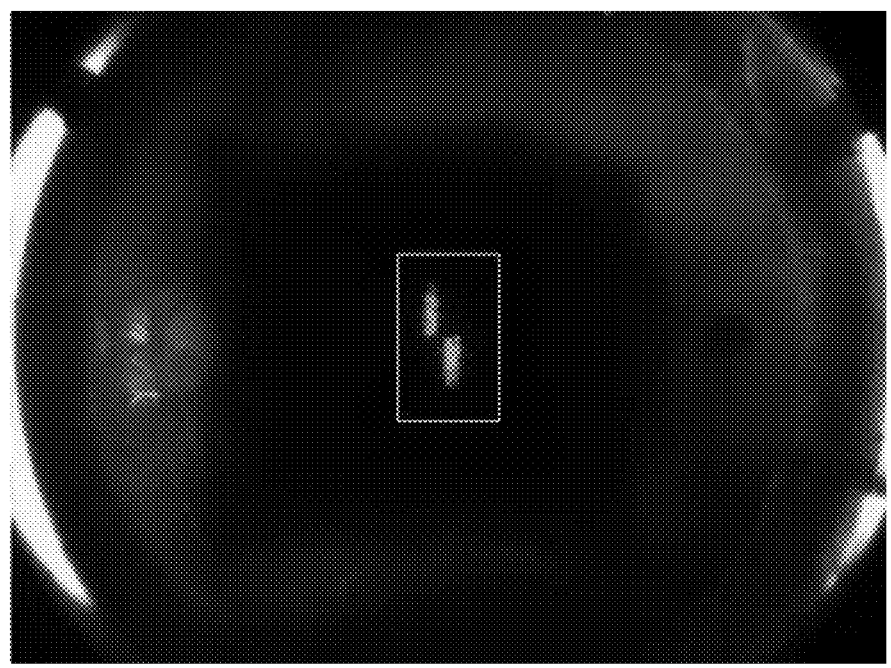
FIG. 7 shows the ROI after Gamma correction has increased luminance contrast and sharpness.

Please refer to FIG. 6. The darker surrounding area in the ROI after the pixel luminance addition processing have a luminance value of 25, as shown on the horizontal axis in the data graph of FIG. 6. However, after the Gamma correction, the darker surrounding area have a luminance value reduced to 5 again, as shown on the vertical axis in the data graph of FIG. 6. On the other hand, the split-image area in the ROI after the pixel luminance addition processing has a luminance value of 50, as shown on the horizontal axis in FIG. 6. However, after the Gamma correction, the split-image area has a luminance value increased to 70, as shown on the vertical axis of FIG. 6. Please also refer to FIG. 7, which shows the ROI after Gamma correction includes the split-image area and the surrounding area having a luminance value of 70 and 5, respectively, with a luminance difference of 65 between them. As can be seen in FIG. 7, the split-image area and the surrounding area in the ROI are largely sharpened and there is a strong contrast between them. In this manner, the examiner can easily focus the image generated by the examination instrument by adjusting to align the two offset rectangular image parts of the split image with each other to form a complete image.

In conclusion, the image-recognition assisting method according to the present invention defines an ROI around a vague and dark split-image area on an image generated by an ophthalmic examination instrument, performs the pixel luminance addition processing on adjoining pixels in the ROI, and performs dynamic contrast correction by Gamma correction to largely sharpen the offset rectangular image parts in the split-image area and the area surrounding the split-image area to create a strong contrast between them. The examiner can easily recognize the two offset rectangular image parts of the split image and make necessary adjustment to align them with each other to achieve optimized focusing of the examination instrument. Therefore, it is able to overcome the problem of a vague split image formed by the conventional split-image focusing screen that is difficult to recognize and prevents the examiner from correctly focusing the examination instrument.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An image-recognition method for assisting an ophthalmic examination instrument, comprising the following steps:
    using an ophthalmic examination instrument to generate a split-focusing image formed by a split-image focusing screen;
    setting a region-of-interest (ROI) around the split-focusing image;
    performing a pixel luminance addition processing on the ROI, wherein the pixel luminance addition processing increases a luminance contrast of all pixels in the ROI by adding luminance values of pixels surrounding each pixel to a luminance value of the surrounded pixel, so that all pixels in the ROI have increased luminance contrast; and
    performing a contrast correction on the ROI having increased luminance contrast, so that a luminance contrast between the split-focusing image and an area surrounding the split-focusing image in the ROI is further increased.

2. The image-recognition method for assisting an ophthalmic examination instrument as claimed in claim 1, wherein the examination instrument is an ophthalmic examination instrument.

3. The image-recognition method for assisting an ophthalmic examination instrument as claimed in claim 2, wherein the ophthalmic examination instrument is used to examine an examinee's retina.

4. The image-recognition method for assisting an ophthalmic examination instrument as claimed in claim 1, wherein the ROI is defined by a value manually set by an examiner for forming a required size of the ROI.

5. The image-recognition method for assisting an ophthalmic examination instrument as claimed in claim 1, wherein the ROI is defined using one of preset values in the examination instrument.

6. The image-recognition method for assisting an ophthalmic examination instrument as claimed in claim 1, wherein the contrast correction is implemented by Gamma correction.

* * * * *